United States Patent [19]

Schulte et al.

[11] Patent Number: 5,997,944
[45] Date of Patent: Dec. 7, 1999

[54] FLOW CONTROLLERS FOR POWDER LACQUERS

[75] Inventors: Heinz-Guenther Schulte, Muehlheim; Paul Birnbrich, Solingen; Harald Frommelius, Monheim, all of Germany

[73] Assignee: Henkel Kommanditgesellschaft auf Aktien, Duesseldorf, Germany

[21] Appl. No.: 08/924,295

[22] Filed: Sep. 5, 1997

Related U.S. Application Data

[63] Continuation of application No. 08/704,697, filed as application No. PCT/EP95/00819, Mar. 6, 1995, abandoned.

[30] Foreign Application Priority Data

Mar. 15, 1994 [DE] Germany .............................. 44 08 656

[51] Int. Cl.⁶ .................................. B05D 1/12; B05D 3/02
[52] U.S. Cl. ............................................. 427/195; 427/201
[58] Field of Search ..................................... 427/189, 195, 427/201

[56] References Cited

U.S. PATENT DOCUMENTS

| | | |
|---|---|---|
| 3,752,793 | 8/1973 | Arlt et al. . |
| 3,873,495 | 3/1975 | Appel et al. . |
| 3,932,358 | 1/1976 | de Cleur et al. .......................... 260/75 |
| 3,935,138 | 1/1976 | Wingler et al. . |
| 3,994,919 | 11/1976 | Jurisch . |
| 4,092,298 | 5/1978 | Humbert et al. .......................... 526/13 |
| 4,314,042 | 2/1982 | Goto et al. ................. 525/59 |
| 4,346,144 | 8/1982 | Craven ................... 428/335 |
| 4,402,983 | 9/1983 | Craven ................... 428/335 |
| 5,047,259 | 9/1991 | Oberkobusch et al. ................. 427/27 |
| 5,130,440 | 7/1992 | Krause et al. ........................ 548/239 |
| 5,196,544 | 3/1993 | Hase et al. ................................ 548/238 |
| 5,294,233 | 3/1994 | Kitahara et al. .......................... 44/334 |

FOREIGN PATENT DOCUMENTS

| | | |
|---|---|---|
| 315 856 | 5/1988 | European Pat. Off. . |
| 355 676 | 4/1993 | European Pat. Off. . |
| 39 14 155 | 10/1990 | Germany . |
| 39 15 874 | 11/1990 | Germany . |
| 4041305 | 6/1992 | Germany . |
| 51-111239 | 10/1976 | Japan . |
| 57-036 165 | 2/1982 | Japan . |
| 62-104837 | 5/1987 | Japan . |
| 63-118 360 | 5/1988 | Japan . |
| 1141948 | 6/1989 | Japan . |
| 2 055 853 | 3/1981 | United Kingdom . |
| 91/14745 | 10/1991 | WIPO . |
| 9414867 | 7/1994 | WIPO . |

OTHER PUBLICATIONS

Elcken et al, Fabre Lack (1993), 99(11), 911–15.
Translation of JP57–036165, Feb. 1985.

*Primary Examiner*—Erma Cameron
*Attorney, Agent, or Firm*—Ernest G. Szoke; Wayne C. Jaeschke; Daniel S. Ortiz

[57] ABSTRACT

The invention is a method for improving the flow of particulate lacquer powders when the lacquer powders are coated on a substrate and the substrate heated to fuse the lacquer particles to provide a finished lacquer surface on the substrate. The flow control agent is an oxazine, oxazoline, oligoxazine or oligoxazoline and salts of the compounds with protonic acids. The flow control agents when included in power lacquer formulations improve the flow of the lacquer when the powder lacquer coated substrate is heated to fuse the coating.

16 Claims, No Drawings

FLOW CONTROLLERS FOR POWDER LACQUERS

This application is a continuation of application Ser. No. 08/704,697 filed on Sep. 16, 1996 now abandoned.

FIELD OF THE INVENTION

This invention relates to flow controllers for powder lacquers which contain compounds bearing cyclic iminoether groups.

RELATED ART

Low-solvent or solventless coating systems are acquiring increasing significance. This group of coating systems includes powder coating, i.e. the coating of metals and plastics by application and sintering of heat-curing powders. They may be applied by rotational sintering, by powder spraying, by fluidized-bed coating and, above all, by electrostatic coating. Thermoset powder lacquers of epoxy, polyester and acrylic resins are particularly suitable for electrostatic powder coating. Thermoplastics of polyamide, polyester, polyethylene, polyethylene/vinyl acetate, polyvinyl chloride and polyepoxides are preferably used for fluidized-bed coating. Powder coating is used above all for machine parts and domestic appliances (including, for example, steel furniture). To promote flow of the plastic powder during baking or sintering, flow controllers are added so that any defects formed during coating, such as streaks, bubbles, craters, orange peel structures and pinholes, are largely eliminated. Known flow controllers include acrylate copolymers which are generally liquid polyacrylate-based products, for example the commercial products Perenol® F 40, Perenol® F 30 P mod (Henkel KGaA) or Modaflow® (Monsanto), which may be incorporated in the powder lacquers in basically two ways:

1. A master batch is prepared. In this case, the liquid flow controller is incorporated by melting in a binder component of the powder lacquer. The solidified melt is then broken up and prepared for subsequent processing.
2. An inert carrier, for example silica, is used for the liquid products.

The disadvantage of master batch technology is that there are limitations to the formulation of powder lacquers because the binder of the master batch has to be identical or at least compatible with the main binder of the formulation.

Flow controllers applied to a carrier can lead to a reduction in the gloss of the lacquer, to a reduction in the transparency of clear lacquers and, under adverse conditions, to a reduction in the storage stability of the powder lacquer on account of the incompatibility of the generally inorganic carrier with the lacquer film.

In addition, solid flow controllers containing 100% by weight of active substance cannot be produced by either method. To overcome these disadvantages, powder-form polyacrylate-based flow controllers which do not require an inert carrier or a master batch process have been developed, particularly for the production of clear lacquers. One such flow controller is described, for example, in EP-A1 0 355 676. The disadvantage of these solid polyacrylates is that the improvement in flow obtainable with small quantities is inadequate and that, although adequate flow properties are obtained where relatively large quantities are used, the resulting films are cloudy.

In addition, the softening temperatures are still so low that the flow controllers can form lumps after prolonged storage.

Cyclic iminoethers are known, for example, from *Encyclopedia of Polymer Science and Technology*, Supplement Vol. 1, page 220, Ed.: H. F. Mark, N. M. Bikales, 1976, Wiley, N.Y. They are cyclic compounds containing an —N═C—O— group. The 2-oxazolines and 5,6-dihydro-4H-1,3-oxazines are investigated in particular detail.

The production of oxazolines substituted by long-chain alkyl groups is described, for example, in EP-A1 315 856.

5,6-Dihydro-4H-1,3-oxazines substituted in the 2-position, hereinafter referred to as oxazines, are known compounds of which the synthesis is described, for example, in DE-A1 39 14 155.

Compounds containing more than one cyclic iminoether group in the molecule are also known, for example from DE-A1 39 15 874.

It is also known that the oxazolines or oxazines can be reacted with protic acids, Lewis acids or alkylating agents (cf., for example, *Encyclopedia of Polymer Science and Technology*, Supplement Vol. 1, page 223, Ed.: H. F. Mark, N. M. Bikales, 1976, Wiley, N.Y. and the literature cited therein). The acids or the alkylating agents attack the nitrogen atom. Salts are formed in this way where protic acids or alkylating agents are used.

The problem addressed by the present invention was to provide solid flow controllers with an active substance content of 10 to 100% by weight and preferably 100% by weight which would be easy to incorporate in powder lacquers, would not lead to any tackiness of the powder in the powder lacquer, even after prolonged storage, and would form non-cloudy or glossy films on baking.

It has been found that cyclic iminoethers and homologs thereof or alkylation products thereof have favorable properties as flow controllers for powder lacquers.

BRIEF DESCRIPTION OF THE INVENTION

This invention relates to flow controllers for powder lacquers, characterized in that they contain compounds bearing cyclic iminoether groups and, if desired, other additives typically encountered in powder lacquers.

Compounds containing cyclic iminoether groups according to the present invention may be divided into four groups:

I monomers of the oxazolines or oxazines,

II alkylation products or salts of these monomers with protonic acids,

III compounds containing several cyclic iminoether groups in the molecule, so-called bis- or oligo-oxazolines, IV alkylation products of the bis- or oligo-oxazolines.

DETAILED DESCRIPTION OF THE INVENTION

The compounds of group I correspond to formula I:

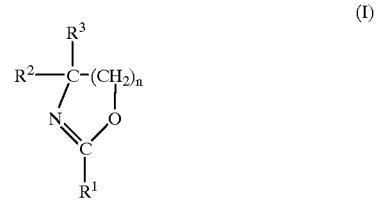

in which
  $R^1$ is an optionally hydroxysubstituted hydrocarbon radical containing 1 to 36 carbon atoms or an aryl or aralkyl group optionally substituted in the aromatic nucleus,
  $R^2$ and $R^3$ independently of one another represent a hydrogen atom or an alkyl radical containing 1 to 4 carbon atoms and n assumes a value of 1 or 2.

The compounds of group II correspond to formula II:

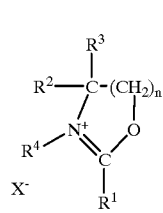

(II)

in which

R$^1$ is an optionally hydroxysubstituted hydrocarbon radical containing 1 to 36 carbon atoms or an aryl or aralkyl radical optionally substituted in the aromatic nucleus, R$^2$ and R$^3$ independently of one another represent a hydrogen atom or an alkyl radical containing 1 to 4 carbon atoms, R$^4$ is a hydrogen atom or an optionally aromatically substituted alkyl radical containing 1 to 18 carbon atoms, X$^-$ is the anion of a halogen atom, of an oxo acid of the halogens, of an oxo acid of the chalkogens or of an organic sulfonic acid or a tetrafluoroborate anion and n assumes a value of 1 or 2.

The substituent R$^1$ may be hydrogen or an optionally branched hydrocarbon radical containing 1 to 36 carbon atoms. The corresponding monomers are, for example, unsubstituted oxazolines or oxazines or methyl, ethyl, n-propyl, i-propyl, n-butyl, i-butyl, t-butyl, n-pentyl, n-hexyl, n-heptyl, 2-ethylpentyl, n-octyl, 2-ethylhexyl, n-nonyl, n-undecyl, n-tridecyl, n-pentadecyl, n-heptadecyl, i-stearyl, n-nonadecyl and n-heneicosanyl, n-tricosane, n-pentacosane, n-heptacosane, n-nonacosane oxazoline or oxazine.

The hydrocarbon radical may be OH-substituted and may represent, for example, a 5-hydroxypentyl or 11-hydroxy-8-heptadecenyl radical.

The substituent R$^1$ may even be an aromatic radical or an alkyl-substituted aromatic radical, for example a phenyl, naphthyl, 2-methylphenyl 4-methylphenyl, 4-t-butylphenyl or 2-t-butylphenyl radical.

Other substituents in the aromatic nucleus, for example halogen atoms, hydroxyl groups, alkoxy groups or nitro groups, are also possible.

The substituents R$^2$ and R$^3$ independently of one another may be a hydrogen atom or an alkyl radical containing 1 to 4 carbon atoms. Compounds of this type are formed when substituted aminoalcohols, for example 2-amino-2-methylpropan-1-ol, are reacted with carboxylic acids in an amide-forming and cyclizing reaction.

The substituent R$^4$ may be a hydrogen atom or an optionally aromatically substituted alkyl radical containing 1 to 18 carbon atoms. Compounds of this type, so-called oxazolinium or oxazinium salts, are formed when 2-oxazolines or oxazines are reacted with protic acids or alkylating agents. Particularly preferred substituents R$^4$ are hydrogen and alkyl radicals containing 1 to 4 carbon atoms.

X$^-$ is the anion of a halogen atom, of an oxo acid of the halogens, of an oxo acid of the chalkogens or of an organic sulfonic acid or a tetrafluoroborate anion. Particularly preferred anions are the chloride anion, the perchlorate anion or the anion of toluene sulfonic acid or trifluoromethane sulfonic acid.

The compounds of group III correspond to formula III:

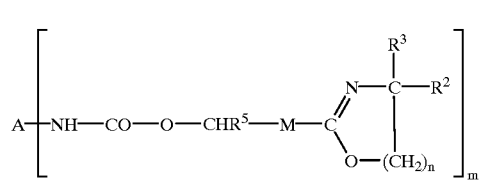

III in which

A is an aliphatic, aromatic or araliphatic group containing 4 to 40 carbon atoms and m represents free valencies at various carbon atoms, m has one of the values 2, 3 or 4, n has a value of 1 or 2, R$^2$ and R$^3$ independently of one another represent a hydrogen atom or an alkyl radical containing 1 to 4 carbon atoms, R$^5$ is selected from the group consisting of H, alkyl or alkenyl and M is selected from the group consisting of alkylene, alkenylene, arylene and alkarylene, R$^5$ and M independently of one another containing 0 to 12 carbon atoms.

The compounds of group IV corresponding to formula IV:

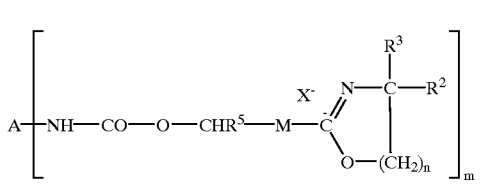

IV in which

A is an aliphatic, aromatic or araliphatic group containing 4 to 40 carbon atoms and m represents free valencies at various carbon atoms, m has one of the values 2, 3 or 4, n has a value of 1 or 2, R$^2$ and R$^3$ independently of one another represent a hydrogen atom or an alkyl radical containing 1 to 4 carbon atoms, R$^4$ is a hydrogen atom or an optionally aromatically substituted alkyl radical containing 1 to 18 carbon atoms, X$^-$ is the anion of a halogen atom, of an oxo acid of the halogens, of an oxo acid of the chalkogens or of an organic sulfonic acid or a tetrafluoroborate anion, R$^5$ is selected from the group consisting of H, alkyl or alkenyl and M is selected from the group consisting of alkylene, alkenylene, arylene and alkarylene, R$^5$ and M independently of one another containing 0 to 12 carbon atoms.

What was said in the definition of formulae I and II applies to the substituents R$^2$, R$^3$ and R$^4$ and X$^-$.

In one advantageous embodiment of the invention, preferred compounds bearing cyclic iminoether groups corresponding to formulae I and II with n=1 and R$^2$ and R$^3$=hydrogen are those in which the substituent R$_1$ is a linear or branched, saturated or monounsaturated hydrocarbon radical containing 7 to 21 carbon atoms, more particularly a linear hydrocarbon radical containing 7 to 17 carbon atoms or a phenyl radical. These oxazolines are derived from saturated or monounsaturated fatty acids of natural or synthetic origin (including technical mixtures thereof) with corresponding chain lengths or from benzoic acid.

Typical representatives of the natural fatty acids mentioned above are caprylic acid, capric acid, lauric acid, myristic acid, palmitic acid, stearic acid, arachic acid, lignoceric acid and behind acid and also 12-hydroxystearic acid and ricinoleic acid.

The so-called montanic acids may also be used as starting materials for oxazolines.

Physical mixtures of various compounds containing cyclic iminoether groups may also be used.

The compounds corresponding to formula I may be prepared by the methods described by S. Kobayashi and T. Saegusa in the monograph entitled "Ring Opening Polymerization", Ed. K. J. Ivin, T. Saegusa, Vol. 2, pages 761–790, London, Elsevier, 1984 or by the processes according to EP-A1 315 856 and DE-A1 39 14 155.

The preparation of compounds corresponding to formula II, so-called oxazolinium or oxazinium salts, is described in *Encyclopedia of Polymer Science and Technology*, Supplement Vol. 1, page 223, Ed.: H. F. Mark, N. M. Bikales, 1976, Wiley, N.Y. and in the literature cited therein. The synthesis is generally carried out by mixing the alkylating agent or the acid with the oxazoline or oxazine at temperatures of 20 to 150° C. and allowing the mixture to react for 1 to 24 h. If desired, a suitable solvent, for example toluene, xylene, ethanol, propanol, isopropanol or acetone, may be added. The synthesis may also be carried out in the absence of a solvent. The generally crystalline salts are isolated and, if necessary, dried.

Suitable acids or alkylating agents are such compounds as, for example, hydrohalic acids, oxo acids or the halogens, such as perchloric acid, oxo acids of the chalkogens, such as sulfuric acid, organic sulfonic acids, such as toluene sulfonic acid or esters thereof, such as methyl tosylate and methyl triflate, and the adduct of HF with boron trifluoride. However, alkyl halides, for example methyl iodide, ethyl bromide or benzyl bromide, may also be used. Other suitable alkylating agents are esters of sulfuric acid, such as dimethyl sulfate for example.

Toluene sulfonic acid and its methyl ester, trifluoromethanoic acid and its methyl ester and perchloric acid are particularly preferred.

The preparation of compounds corresponding to formula III is described in German patent application DE-A1 39 15 874. According to the teaching of this document, the bis-oxazolines are preferably prepared by reaction of ricinoloxazoline, i.e. 11-hydroxy-8-heptadecenyl-2-oxazoline, with isocyanates having a functionality of two or higher.

Compounds corresponding to formula IV are prepared by methods similar to those used for the preparation of compounds corresponding to formula II, as described above.

The compounds containing cyclic iminoether groups according to the invention are suitable for use as flow controllers for powder lacquers.

Powder lacquers are generally produced as follows:
The binder is intensively homogenized with pigments, hardeners and additives in a mixer. The additives used include, above all, flow aids, fatty acid esters, such as hydrogenated castor oil, agents for preventing pinholes, such as benzoin, flatting agents, such as polyethylene waxes or silica, hardening accelerators or UV stabilizers. Depending on the particular application, the quantities added may be between 0.1 and 5% by weight, based on the powder lacquer. Although the additives are normally added as individual substances, it is of course possible to mix the various additives to form a single compound known as a flow aid. The quantity of compounds containing cyclic iminoether groups in this compound may be between 10 and 100% by weight and is preferably between 20 and 80% by weight, based on the compound.

The mixture of binder, pigments and additives is extruded. The extrudate is roughly ground and then finely ground to form a processable powder lacquer.

The powder lacquers to be improved in their flow properties by the compounds containing cyclic iminoether groups according to the invention contain thermoplastic or thermosetting synthetic resins and 0.1 to 2.0% by weight and preferably 0.5 to 1% by weight, based on the total weight of the powder lacquers, of one or more of the compounds according to the invention containing cyclic iminoether groups and, optionally, pigments and typical additives, such as hardening agents, hardening accelerators and UV stabilizers. Powder lacquers based on epoxides for crosslinking with carboxyfunctional polyesters (so-called hybrid systems) and on carboxyfunctional polyesters for crosslinking with triglycidyl isocyanurates are preferred.

The advantages of the new flow controllers lie essentially in their ready processability (for example dry blending and metering) to powder lacquers, in their relatively high stability in storage (for example no agglomeration) and in their better flow behavior (for example not only are fish eyes, craters and pinholes avoided, the orange-peel effect is also distinctly reduced).

Above all, the compounds according to the invention containing cyclic iminoether groups enable completely streak-free clear lacquer films and glossy pigmented films to be produced.

EXAMPLES

All percentages in the Examples are by weight, unless otherwise indicated.

The products were characterized as follows:
1. The melting range was determined using a Kofler heating bench or by differential scanning colorimetry (DSC).
2. The OH value was determined in accordance with DIN 53240.

Example 1

Heptadecyl-2-oxazoline prepared in accordance with EP-A1 315 856.

Example 2

Heneicosanyl-2-oxazoline prepared in accordance with EP-A1 315 856.

Example 3

In a 1 liter three-necked flask equipped with a stirrer, internal thermometer, dropping funnel, reflux condenser and nitrogen inlet, 140.5 g of pentadecyl oxazoline (0.5 mole) were mixed with 330 g of isopropanol and 56.6 ml of trifluoromethane sulfonic acid ester (0.50 mole) were added through the dropping funnel. The temperature rose to 52° C. After stirring for 1 hour, 300 ml of diethyl ether were added and the resulting crystals of the oxazolinium salt were filtered off and dried in a desiccator.

Example 4

An oxazolinium salt was prepared as in Example 3 from 140.5 g of pentadecyl oxazoline (0.5 mole) and 93.1 g of p-toluene sulfonic acid methyl ester (0.5 mole).

Example 5

An oxazolinium salt was prepared as in Example 3 from 112.5 g of undecyl oxazoline (0.5 mole) and 82.0 g of trifluoromethane sulfonic acid ester (0.5 mole).

Example 6

In a 1 liter three-necked flask equipped with a stirrer, internal thermometer, dropping funnel, reflux condenser and nitrogen inlet, 92.7 g of heptadecyl oxazoline (0.3 mole) were mixed with 200 ml of toluene and 55.9 g of p-toluene sulfonic acid methyl ester (0.3 mole) were added through the dropping funnel. The temperature rose from room temperature to 50° C. After stirring for 3 hours at a temperature of 110° C., the toluene was removed in a rotary evaporator, leaving a white wax which could be recrystallized from acetone. The melting range was 55–68° C.

Example 7

In a 2 liter three-necked flask equipped with a stirrer, internal thermometer, dropping funnel, reflux condenser and nitrogen inlet, 88.2 g of phenyl oxazoline (0.6 mole) were dissolved in 800 ml of isopropanol and 86.1 g of 70% perchloric acid (0.6 mole) were added at room temperature through the dropping funnel. After standing overnight, the crystals of the oxazolinium salt which had formed were filtered off and dried in a desiccator. The melting range was 130–147° C.

Example 8

An oxazolinium salt was prepared as in Example 7 from 112.5 g of undecyl oxazoline (0.5 mole) and 71.8 g of 70% perchloric acid (0.5 mole). The melting range was 85–105° C.

Example 9

An oxazolinium salt was prepared as in Example 3 from 91.0 g of a bis-oxazoline of 2 moles of ricinoloxazoline and 1 mole of diphenyl methane diisocyanate (0.1 mole oxazoline groups) prepared in accordance with DE-A1 39 15 874 and 18.6 g of p-toluene sulfonic acid methyl ester (0.1 mole).

Performance Testing:

To determine their suitability as flow controllers, the compounds containing cyclic iminoether groups to be used in accordance with the invention were tested in the following powder lacquer systems.

A Epoxy/Polyester Lacquer (hybrid system)

A powder lacquer composition of 50 parts by weight of an epoxy resin I, 50 parts by weight of a polyester resin II and 0.5 part by weight of benzoin was mixed with 1 part by weight of the flow controller to be tested. The mixture was then extruded, granulated, ground and sieved. The powder lacquers obtained were electrostatically applied to a metal surface and baked for 12 mins. at 180° C. The epoxy resin was a commercial product based on bisphenol A and epichlorohydrin. The oil-free polyester resin used was also a commercially available product containing free carboxyl groups. The resins had the following characteristic data:

|  | I | II |
| --- | --- | --- |
| Epoxide equivalent weight | 715–835 | — |
| Glass transition temperature, °C. | — | 43–48 |

-continued

|  | I | II |
| --- | --- | --- |
| Softening range (Kofler) °C. | 70–80 | 70–80 |
| Acid value (DIN 53402) | — | 65–80 |
| Melt viscosity, Pa·s | — | 8–16 |
| (DIN 53229/160° C./cone-plate) |  |  |
| (DIN 53735 21.2 N/120° C.) | Approx. 50 | — |

The baking conditions were 5 minutes at 200° C., 8 minutes at 180° C. or 17 minutes at 165° C. (the temperatures shown are the object temperatures).

B Polyester Lacquer

A powder lacquer was prepared as described in A from 93 parts by weight of a polyester resin (III) containing free carboxyl groups and 7 parts by weight of triglycidyl isocyanurate with addition of 1 part by weight of flow controller and was applied to a metal surface. The polyester resin had the following characteristic data:

|  | III |
| --- | --- |
| Softening point (Kofler) | 77–87° C. |
| Glass transition temperature | 55–60° C. |
| Melt viscosity DIN 53229, 160° C., cone/plate | 30–60 Pa·s |
| Acid value DIN 54302 | 30–36 mg KOH/g |

The baking conditions were 5 minutes at 200° C., 8 minutes at 180° C. or 17 minutes at 165° C. (the temperatures shown are the object temperatures).

The flow controllers according to the Examples showed satisfactory processing behavior and remained free-flowing.

The clear lacquers obtained did not show any visible signs of clouding, even in layer thicknesses of >100 μm.

The results of the flow tests are set out in the following Table.

TABLE

| Lacquer system | Additive | Evaluation | Clouding |
| --- | --- | --- | --- |
|  | — | 5 | No |
| A | Ex.1 | 3 | No |
| Polyester/ | Ex.3 | 2–3 | No |
| epoxide | Ex.5 | 4 | No |
|  | Ex.6 | 2–3 | No |
|  | Ex.9 | 4 | No |
|  | — | 5 | No |
| B | Ex.2 | 3 | No |
| Polyester/ | Ex.4 | 3 | No |
| TGIC | Ex.6 | 2–3 | No |
|  | Ex.7 | 4 | No |
|  | Ex.8 | 3–4 | No |

TGIC = Tris-glycidyl isocyanurate
Evaluation of flow:
0 = excellent flow, substantially flat film surface
1 = good flow, slight structure
2 = moderate flow, orange-peel effect
3 = as 2, some pinholes, slight pitting
4 = moderate flow, some craters, numerous pinholes
5 = poor flow, numerous craters

We claim:

1. In a method for controlling the flow of a powder lacquer wherein a dry powder lacquer, containing a flow control agent, is applied to a substrate to form a powder lacquer coated substrate and the powder lacquer coated substrate is heated to form a finished lacquer coated substrate, the improvement which comprises:

from 0.1 to 2.0% by weight of the powder lacquer of at least one flow control agent selected from the group consisting of compounds of the formula

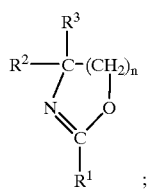
(I)

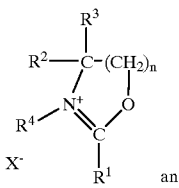
(II)

and

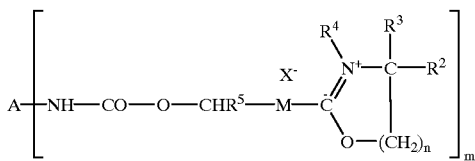
(IV)

wherein
$R^1$ is selected from the group consisting of optionally hydroxysubstituted hydrocarbon groups containing 1 to 36 carbon atoms, aryl groups, aralkyl groups, aryl groups substituted in the aromatic nucleus and aralkyl groups substituted in the aromatic nucleus, wherein the substituted aromatic nucleus is substituted with at least one member selected from the group consisting of halogen, hydroxyl, alkoxy and nitro,
$R^2$ and $R^3$ independently of one another represent a hydrogen atom or an alkyl group containing 1 to 4 carbon atoms,
$R^4$ is a hydrogen atom or an optionally aromatically substituted alkyl group containing 1 to 18 carbon atoms,
$X^-$ is an anion selected from the group consisting of anions of halogen atoms, anions of oxo acids of halogens, anions of oxo acids of chalcogens, anions of organic sulfonic acids and tetrafluoroborate anion,
n has a value of 1 or 2, m represents free valencies of A and has a value of 2, 3 or 4, A is an aliphatic, aromatic or araliphatic group containing 4 to 40 carbon atoms, M is selected from the group consisting of alkylene, alkenylene, arylene and alkarylene, each containing 0 to 12 carbon atoms and $R^5$ is selected from the group consisting of H, alkyl containing up to 12 carbon atoms, and alkenyl containing up to 12 carbon atoms.

2. The method claimed in claim 1, wherein, in formula I, $R^1$ is a linear hydrocarbon group containing 7 to 21 carbon atoms or a phenyl group, $R^2$ and $R^3$ represent hydrogen and n has a value of 1.

3. The method claimed in claim 1, wherein, in formula II, $R^1$ is a linear hydrocarbon group containing 7 to 21 carbon atoms or a phenyl group, $R^2$ and $R^3$ represent hydrogen, $R^4$ is hydrogen or a methyl group, $X^-$ is an anion selected from the group consisting of perchlorate anions, anions of toluene sulfonic acid and anions of trifluoromethane sulfonic acid and n has a value of 1.

4. The method claimed in claim 1 wherein the powder lacquer comprises an epoxy-resin-based powder lacquer.

5. The method claimed in claim 2 wherein the powder lacquer comprises an epoxy-resin-based powder lacquer.

6. The method claimed in claim 3 wherein the powder lacquer comprises an epoxy-resin-based powder lacquer.

7. The method of claim 1 wherein the flow control agent comprises 2-heptadecyl-2-oxazoline.

8. The method of claim 1 wherein the flow control agent comprises 2-heneicosanyl-2-oxazoline.

9. The method of claim 1 wherein the flow control agent comprises the trifluoromethane sulfonic acid salt of 2-pentadecyl-2-oxazoline.

10. The method of claim 1 wherein the flow control agent comprises the p-toluene sulfonic acid salt of pentadecyl oxazoline.

11. The method of claim 1 wherein the flow control agent comprises the trifluomethane sulfonic acid salt of unidecyl oxazoline.

12. The method of claim 1 wherein the flow control agent comprises the p-toluene sulfonic acid salt of heptadecyl oxazoline.

13. The method of claim 1 wherein the flow control agent comprises the perchloric acid salt of phenyl oxazoline.

14. The method of claim 1 wherein the flow control agent comprises the perchloric acid salt of unidecyl oxazoline.

15. The method of claim 1 wherein the flow control agent comprises the p-toluene sulfonic acid salt of the bis oxazoline formed by reaction of 2 moles of recinoloxazoline with 1 mole of diphenyl methane diisocyanate.

16. The method of claim 1 containing from 0.5 to 1% by weight of the powder lacquer of the at least one flow control agent.

* * * * *